United States Patent [19]

Liedholm

[11] 4,235,012
[45] Nov. 25, 1980

[54] METHOD OF FORMING A STRIP HEATER EXPANSION JOINT

[75] Inventor: David W. Liedholm, Fremont, Calif.

[73] Assignee: Raychem Corporation, Menlo Park, Calif.

[21] Appl. No.: 938,592

[22] Filed: Aug. 31, 1978

[51] Int. Cl.³ .......................................... H01C 1/016
[52] U.S. Cl. ..................................... 29/611; 72/387; 219/530; 219/535; 338/316
[58] Field of Search ................... 29/611, 610; 219/535, 219/530, 536, 540, 544, 549; 72/387; 174/138 J; 338/316

[56] References Cited

U.S. PATENT DOCUMENTS

| | | | |
|---|---|---|---|
| 2,777,300 | 1/1957 | Palmer | 29/611 |
| 2,874,258 | 2/1959 | Kuhn | 338/616 |
| 3,949,189 | 4/1976 | Bilbro | 219/535 |

*Primary Examiner*—Francis S. Husar
*Assistant Examiner*—Gene P. Crosby
*Attorney, Agent, or Firm*—Lyon & Lyon

[57] ABSTRACT

An expansion joint for metallic foil strip heaters encasing resistive heating elements comprised of a bend formed in the metallic foil strips. The expansion joint is formed by use of a tool for passing a roller in the tool handle over a rigid forming support affixed to the tool bottom forming plate with the metallic foil strip heater placed between the roller and the forming support. The tool is then removed and a flexible metal support hose is affixed to the object to be heated with the bend in the metallic foil strips placed over this support hose. The bend is then affixed to the object to be heated on either side of the support hose.

2 Claims, 7 Drawing Figures

METHOD OF FORMING A STRIP HEATER EXPANSION JOINT

BACKGROUND OF THE INVENTION

The invention is for use in the field of heating pipelines and vessels with metallic foil strip heaters using resistive heating elements. Expansion joints are necessary to eliminate mechanical stresses created by differences in the heat expansion rate of the metallic foil of the strip heaters and that of the pipeline or vessel being heated. With long strip heater systems, the heater strip expands sufficiently to damage electrical connector boxes and insulation where no means to accommodate expansion are provided. There is also a danger of uncontrolled buckling which can cause wire insulation failure and inadvertent electrical grounding. Reference is made to the co-pending application "Flat Conductor to Round Conductor Connection System," Ser. No. 937,889, filed Aug. 29, 1978 and incorporated by reference herein.

SUMMARY OF THE INVENTION

The present invention is directed to providing an expansion joint structure and method for forming such a joint for use in strip heaters for pipelines and vessels.

Disclosed is a structure having as its principal object relief of mechanical stresses on electrical connections and mechanical connections between the heater and the object being heated caused by differences in the heat expansion rates of the metallic foil strips and the object to be heated.

The expansion joint is comprised of a bend, preferably cylindrical, in the metallic foil strips preferably at the location of slots die cut therein. The bend is supported by a support device, preferably a flexible steel support hose, to prevent crushing. The flexible steel hose is attached to the object to be heated usually by passing a strap through the hose and around the object to be heated. The bend is placed over the support hose and attached to the object being heated preferably by wrapping reinforced fiberglass tape around the object to be heated on either side of the bend.

The tool for forming the expansion joint is comprised of a bottom forming plate with a rigid forming support attached thereto. Preferably the rigid forming support is a steel cylinder slightly wider than the heater strip. A forming handle holds a roller means which rolls over the surface of the rigid forming support when the metallic foil strips are placed between the roller means and the rigid forming support. The bend in the expansion joint is formed as the forming handle is pivoted around the rigid forming support.

The claimed method is comprised of the steps in the operation just described.

DETAILED DESCRIPTION OF A PREFERRED EMBODIMENT

Figure 1:
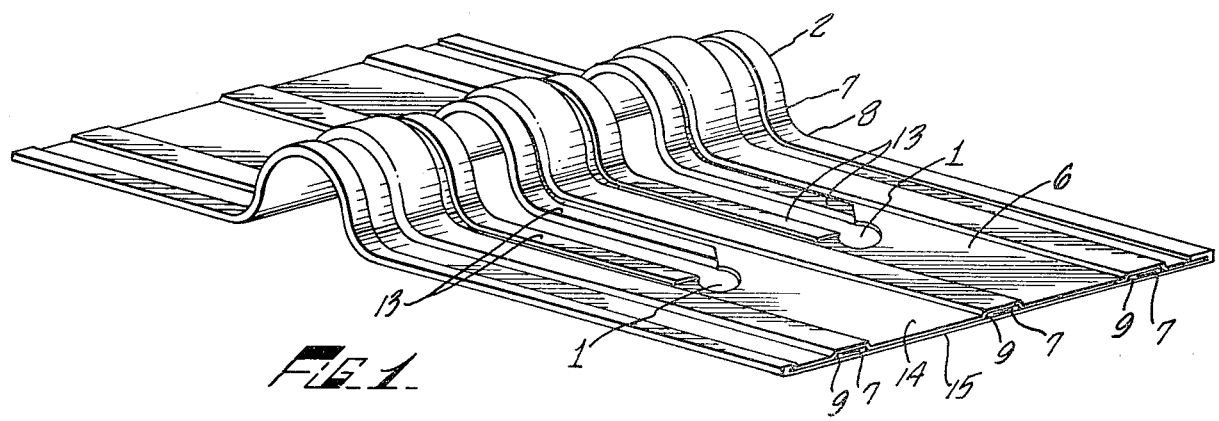
FIG. 1 shows the expansion joint in perspective less the support hose and straps.
Figure 7:
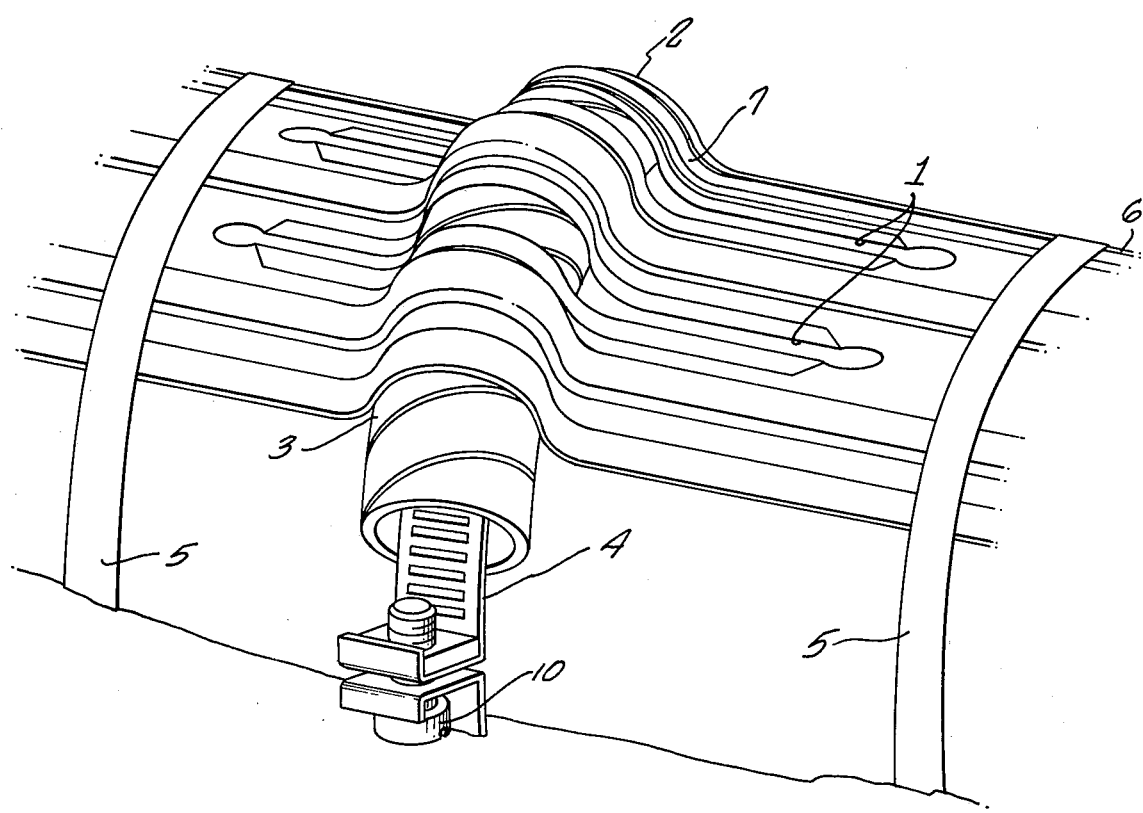

The following description is of the preferred embodiment and the best mode of practicing the invention. Referring to FIGS. 1 and 7, the expansion joint bend and its installation on a pipeline are illustrated. It is comprised of slots 1 in a metallic foil strip heater 6, a bend 2, and a hollow, flexible steel support hose 3. The expansion joint is further comprised of a strap 4 for clamping the flexible steel support hose to the object to be heated and reinforced fiberglass tape 5 for fastening the bend 2 securely over the flexible steel support hose 3.

Figure 3:
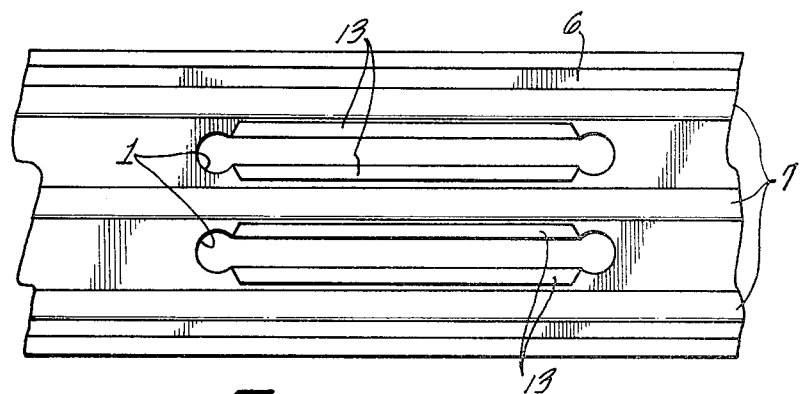
FIG. 3 is a top view of the slots in the metallic foil strips of the strip heater.
Figure 6:
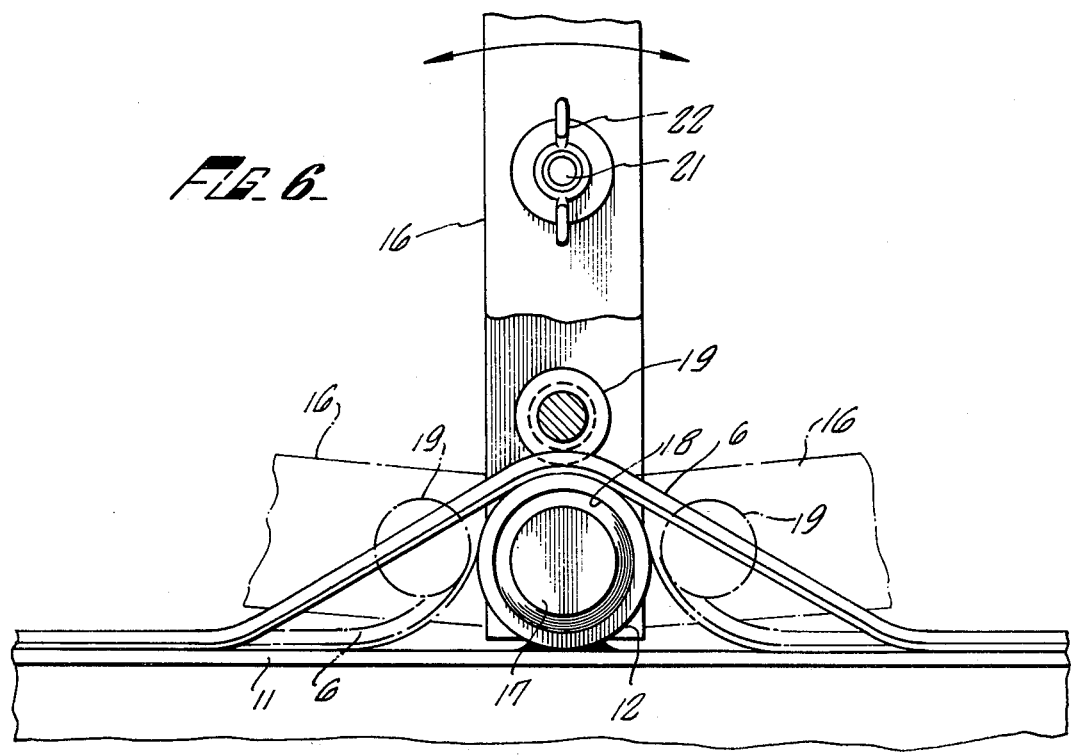

Referring to FIGS. 1 and 3, two slots 1 are die cut in strip heater 6 between the three encased resistive heating elements 7 and parallel to them as shown in FIG. 6. An expansion joint can be formed at each set of slots 1. The purpose of the slots 1 is to facilitate bending of the metallic foil strips 14 and 15 of the strip heater 6 around a pipeline. The number of slots set in a given length of strip heater depends upon the dimensions of bend 2 in the expansion joint. It is preferable to limit the amount of expansion to be absorbed by each joint to an amount less than the radius of bend 2. In the preferred embodiment, the slots 1 are cut in metallic foil strip heater 6 every fifty feet (17 meters) where the radius of the bend 2 is one half inch.

As shown in FIG. 1, the edges of each slot are folded over; thee folds 13 are intended to prevent separation of the edges of the two metallic foil strips 14 and 15 of strip heater 6 during thermal expansion and contraction. The folds are made by leaving flaps on the edges of slots 1 when the slots are die cut in foil strips 14 and 15 after lamination of strip heater 6. These flaps are punched up through slot 1 and stamped down over the strip heater 6.

Bend 2 is provided to serve as a "reservoir" for the thermal expansion and contraction of the metallic foil strip heater 6. As the strip heater contracts between expansion joints, each bend 2 becomes flatter. As the strip heater 6 expands between the expansion joints, each bend 2 becomes more pronounced.

The bend 2, in the preferred embodiment, is half cylindrical in shape. The diameter of the bend can of course vary depending upon the distance between expansion joints and the amount of expansion which must be accommodated. For example, for joints 50 feet apart bend 2 can accommodate expansion of up to 0.5 inches. Referring to FIGS. 1 and 7, the flexible metal support hose 3 is provided to support bend 2 to prevent accidental crushing which could damage electrical insulation 9 surrounding the encased resistive heating elements 7. In the preferred embodiment, the support hose 3 is cylindrical and made of lightweight, flexible steel conduit. Other rigid materials could be used. When the bend has an inside diameter of 1.12 inches, the flexible metal support hose is a cylinder of outside diameter of 1.12 inches (30 mm). International Metal Hose Co. catalogue No. NA 340 flexible steel conduit can be used for the support hose.

The hollow flexible metal support hose 3 is fastened to the object to be heated by a strap means 4 which passes through the hollow center of support hose 3 and around the object to be heated. In the preferred embodiment, the strap means is metal and has an adjustable clamp 10 to tighten it. Other materials or means may be used in different applications.

The metallic foil strips 14 and 15 of the strip heater 6 are secured to the pipeline on both sides of bend 2 by reinforced fiberglass tape 5. If the object to be heated is a vessel, alternate means for fastening the strip heater to the vessel may be used.

Figure 2:
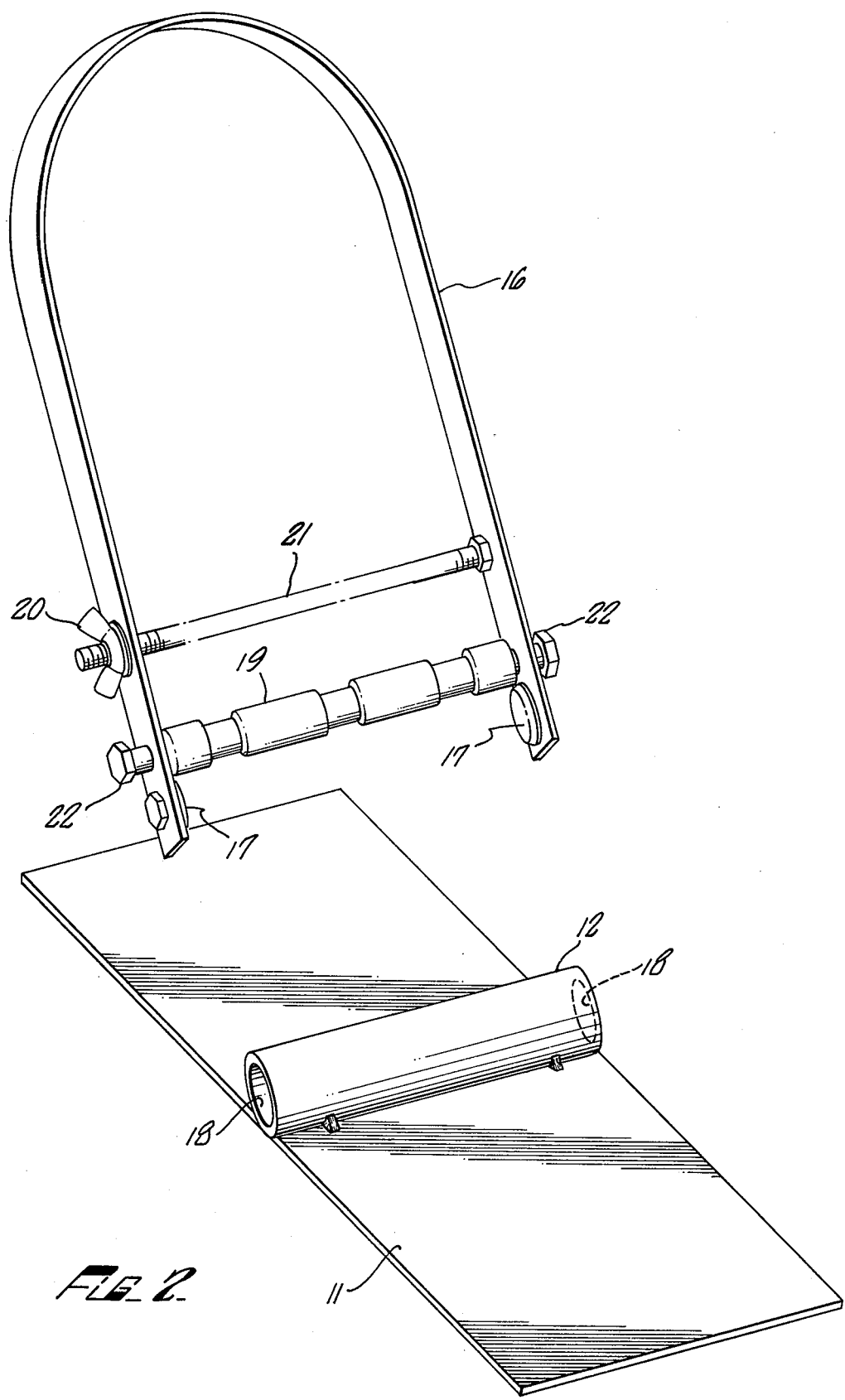
FIG. 2 shows the disassembled tool for forming the expansion joint.

The expansion joint can be formed by any convenient means. However, a specially designed tool is preferred such as shown in FIG. 2 as it allows joints to be conveniently formed in the field. This tool is shown in FIG. 2 in disassembled form. The tool is comprised of a bottom forming plate 11 with a rigid forming support 12 affixed thereto. The rigid forming support 12 is a metal cylinder of outside diameter substantially equal to the diameter of the bend 2, and has a length at least as wide as the metallic foil strips 14 and 15 of strip heater 6. A forming handle 16 has pivot means 17 which are inserted in the ends 18 of rigid forming support 12.

A rollr means 19 is attached to the forming handle 16 for purposes of pressing metallic foil strips 14 and 15 over the rigid forming support 12. In the roller means 19 are contoured indentations sized and spaced suitably to fit over the resistive heating elements 7 of strip heater 6.

The forming handle 16 also has affixed thereto clamping means 20 which, in the prefered embodiment, is a machine screw 21 passing through both sides of forming handle 16 with a wing nut on the end thereof. Clamp means 20 causes pivot means 17 to move closer together or farther apart depending upon the position of the wing nut on machine screw 21.

Roller means 19 has, on either end, an extended shaft 22 consisting of a machine bolt extending through holes in the forming handle 16 and threaded into the ends of roller means 19. The heads of the machine bolts are located away from the ends of roller means 19 such that pivot means 17 can move farther away from each other when clamping means 20 is loosened.

Figure 4:
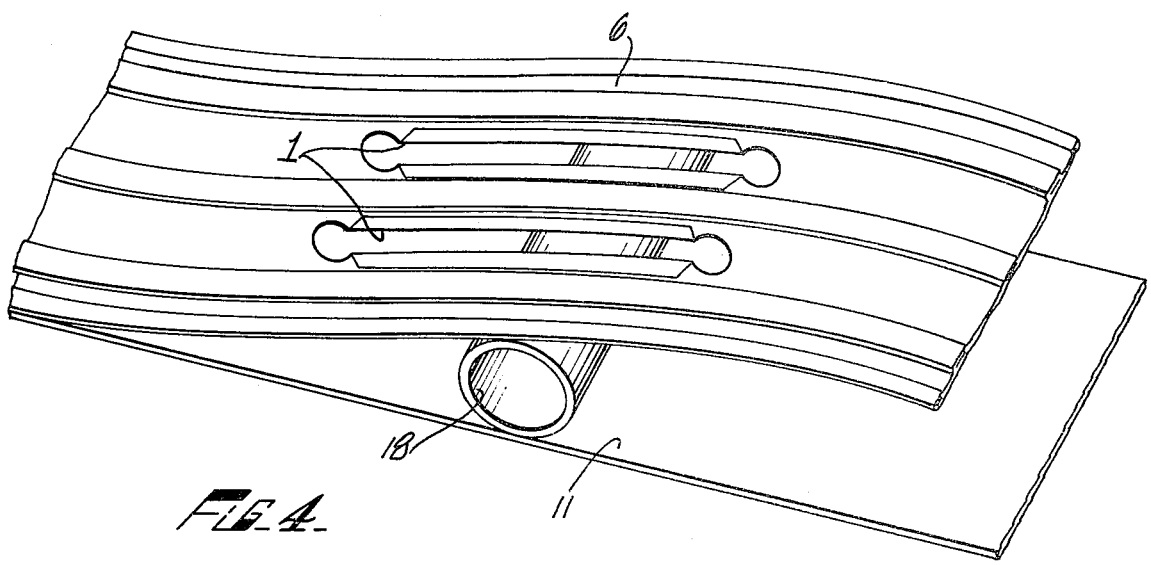
FIGS. 4 through 7 illustrate the method of forming the expansion joint and the expansion joint in final form.
Figure 5:
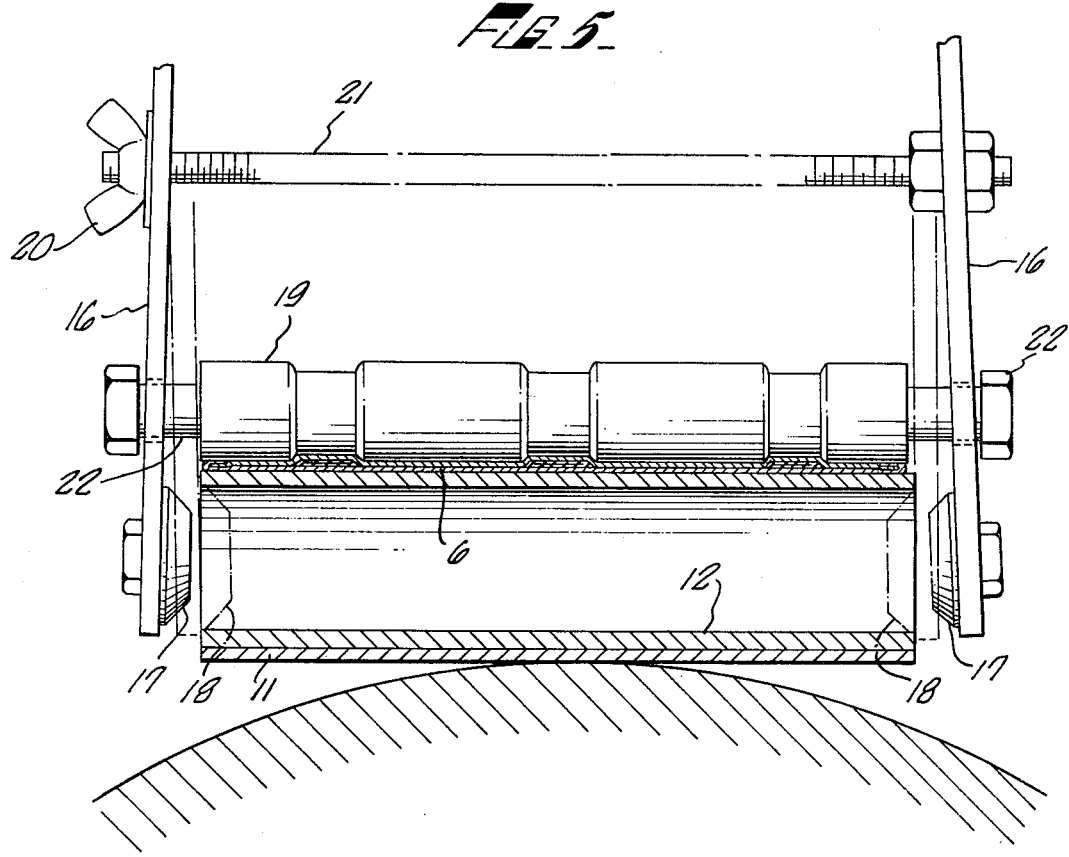

The method of forming the expansion joint is illustrated in FIGS. 4, 5, and 6. The expansion joints can be formed as each pair of slots 1 is reached as the strip heater 6 is installed on the object to be heated. When a pair of slots 1 is reached, the bottom forming plate 11 is placed under strip heater 6 with rigid forming support 12 centered under slots 1 as illustrated in FIG. 4.

FIG. 5 shows forming handle 16 being attached to rigid forming support 12 by loosening of the wing nut of clamping means 20, insertion of pivot means 17 into ends 18 of rigid forming support 12, and retightening of the wing nut.

Referring to FIG. 6, after the forming handle 16 is attached to bottom forming plate 11, the handle is swung back and forth until the bend 2 is set in the strip heater 6.

FIG. 7 shows the expansion joint in its completed form after flexible metal support hose 3 has been fastened to a pipeline by strap means 4 and bend 2 has been secured to the pipeline on either side of support hose 3 by reinforced fiberglass tape 5.

Although the invention has been described in terms of a preferred embodiment, other embodiments such as bends and rigid forming support of other shapes and materials are intended to be included. Also methods for pressing metallic foil strips 14 and 15 around a rigid forming support by hydraulic or other press means substantially different from the forming handle and roller means disclosed herein are intended to be included.

I claim:

1. A method of forming an expansion joint in a heater apparatus of the type utilizing two slotted metallic foil strips encasing, in laminar style, a resistive heating element comprising:
   (a) placing a bottom forming plate with a rigid forming support affixed thereto under said metallic foil strips at the center of said slot with said rigid forming support disposed perpendicular to said slot;
   (b) pressing said metallic foil strips down around said rigid forming support to form a bend;
   (c) removing said bottom forming plate;
   (d) affixing a support means to the object to be heated to support said bend; and
   (e) affixing said bend in said metallic foil strips, formed in step (b) above, to the object to be heated directly over said support means.

2. A method of forming an expansion joint as defined in claim 1 wherein said pressing step is comprised of rolling a roller means over the surface of said rigid forming support means with said metallic foil strips between said roller means and said rigid forming support wherein said rigid forming support is comprised of a rigid cylinder affixed to said bottom forming plate.

* * * * *